March 6, 1962     M. BAERMANN     3,024,392
PROCESS FOR THE MANUFACTURE OF PLASTIC
BOUND PERMANENT MAGNETS
Filed Aug. 15, 1955
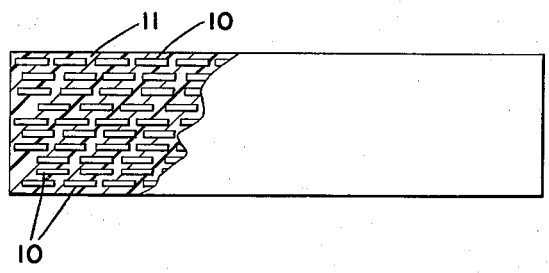
INVENTOR.
MAX BAERMANN
BY *Alfred C Body*
ATTORNEY

United States Patent Office 3,024,392
Patented Mar. 6, 1962

3,024,392
PROCESS FOR THE MANUFACTURE OF PLASTIC BOUND PERMANENT MAGNETS
Max Baermann, Bensberg-Wulfshof, Koln (Rhine), Germany
Filed Aug. 15, 1955, Ser. No. 528,512
Claims priority, application Germany Aug. 27, 1954
10 Claims. (Cl. 317—201)

This invention pertains to the art of permanent magnets and more particularly to a process of manufacturing permanent magnets using a hardened plastic binder.

In the manufacture of molded permanent magnets using a powdered magnetc material and a hardened plastic binder, extreme difficulties are presented if we wish to process anisotropic magnetic materials so that the principal axis of magnetization reaches the maximum strength in the finished product. The finer the powder from which the magnet is pressed, the more difficult it is to achieve this result.

The reason for this is not only that the orientation of the particles in the magnetizing field during molding of the magnet is more imperfect, the smaller the particle size, but also when the mold has a greater height, the friction between the individual particles obstructs their movement into magnetic orientation or alignment in the magnetizing field.

It has heretofore been proposed with pulverized cast material to at least partially overcome these problems by first making the magnetic material into relatively small tables and then pressing several tablets together into a finished magnet.

With extremely small particles of oxide powders, however, even this method presents considerable difficulties since the usual tablets already have too much volume to make possible a satisfactory alignment or orientation of the particles.

The same difficulties also occur in the known sintering processes in which the anisotropic oxide powder particles are put into a mold after suitable preliminary treatment, and aligned by powerful magnetic fields. Here also it is impossible to have all of the particles orient themselves in the magnetizing field in the desired direction, or to keep them in this direction by pressing.

The present invention contemplates and has for its principal object a new and improved process for the manufacture of permanent magnets made from powdered materials and bound into the finished shape by a plastic binder which overcomes all of the above difficulties, and others, and enables magnets to be produced of maximum strength and high retentivity.

In accordance with the present invention permanent magnets are made by the process of forming permanently magnetic oxide powder into small diameter rod-shaped bodies of small cross-sectional area by known sintering processes, mixing such bodies with hardenable plastic, placing the mixture in a mold under the influence of powerful magnetizing fields and pressing the mixture into a molded body.

Using such a process practically all of the rod-shaped small magnetic bodies used for the formation of the final molded body are satisfactorily aligned in the desired direction. A magnet results which has high strength and efficiency.

Further, in accordance with the invention, anisotropic permanently magnetic oxide powder is used for the making of the small diameter rod-shaped bodies of small cross-sectional area by placing the powder in a small mold under the influence of a magnetic field and pressing and sintering such bodies in the usual manner. Thereafter these bodies are mixed with a plastic and molded generally under the influence of a powerful magnetic field.

The dimensions of the bodies may be as desired, but using a cross-section of one to two square millimeters and a length of from two to four millimeters, a sufficiently small volume results to make possible the proper alignment or orientation of all the single anisotropic oxide particles. It is thus possible to obtain optimum magnetic qualities.

Also, because of the small volume of the bodies, the danger of destroying the orientation of the single oxide particles during the molding process, once it has been established by the magnetic field, is practically eliminated.

While the cross-sectional shape of the bodies may be as desired, e.g. circular, one embodiment of the invention contemplates a polygonal shaped cross-section. In this respect a hexagonal or octagonal cross-section has proven particularly advantageous since movements or rotations about the lengthwise axis of the elongated rod-shaped bodies can easily occur when filling the mold, such rotation taking place more easily than when a triangular or quadrangular cross-section is employed.

It is preferred to bring the principal axis of orientation brought on by the crystal anisotropy into alignment with the lengthwise axis of the small rod-shaped sintered bodies. Thus it is possible to obtain, in addition to the crystal anisotropy, a shape anisotropy at the same time so that when the bodies are placed in the mold and subjected to a magnetic field, they will become properly oriented and when the magnet is pressed, it will have high permanent magnetic quality factors, in addition to a high space factor.

Another object of the present invention is the provision of a new and improved process for the manufacture of permanent magnets from powdered magnetic material bonded to shape by a hardened plastic which is simple, easily carried out and will provide a magnet of a high degree of magnetic orientation, maximum strength and maximum retentivity.

Another object of the invention is the provision of a new and improved process for the manufacture of permanent magnets, of the general type referred to, wherein the magnetic material is first formed into rod-shaped bodies of small cross-sectional area in the presence of powerful magnetizing fields and thereafter the bodies are molded into a magnet of any desired size.

Still another object of the invention is the provision of a new and improved process for the making of plastic bound permanent magnets wherein elongated bodies having a polygonal cross-sectional shape of small cross-sectional area are formed and then the bodies are assembled and molded into a larger magnet.

Still another object of the invention is the provision of a new and improved method of making plastic bound permanent magnets wherein anisotropic permanent magnet oxide powder is pressed into elongated bodies of small cross-sectional area under the influence of a magnetic field, sintered, and the bodies are thereafter assembled and molded into a larger magnet using a hardened plastic material to bind the bodies into a single magnet.

The invention may take physical form in a number of different steps and combination of steps. The drawing illustrates an example of a permanent magnet made in accordance with the present invention.

A preferred embodiment of the invention contemplates providing one or more of the known permanent magnetic oxide powders, placing such material in one or a plurality of molds having a cross-sectional area of from one to two square millimeters and a length of from two to four millimeters and heating such powder while in the mold, to effect a sintering of the powder into solid, elongate bodies 10 of the shape and area of the mold.

Because of the small size of the body 10 and freedom of weight on the lowermost particles, they are able to freely orient themselves to provide a maximum anisotropy to the bodies.

Thereafter these bodies 10 are mixed with a plastic 11 such as a polyester resin, and the mixture is then placed in a larger mold of the shape in which it is desired to mold the ultimate magnet. This mold has known means for exerting a magnetic force on the bodies. The magnetic force causes the elongate bodies to align themselves with the magnetic field even against the friction of the plastic. Pressure is applied along with heat to cause the resin to harden, while at the same time applying a magnetic force to the mixture.

It is not believed necessary to describe temperatures or pressures employed, as it is believed that these are all within the skill of the art. The principal novelty of the present invention lies in preforming rod-shaped bodies from small cross-sectional area magnetic material and thereafter mixing the preformed bodies with a plastic binder and molding such mixture while under the influence of a magnetic field into any desired shape or size permanent magnet.

The invention is susceptible to various modifications and alterations which will occur to others upon a reading and understanding of this specification and it is my intention to include all such modifications and alterations insofar as they come within the scope of the appended claims.

Having thus described my invention, I claim:

1. A method for making plastic bound permanent magnets comprising the steps of providing powders of permanent magnet material, forming such powders into rod-shaped bodies of small cross-sectional area, mixing such bodies with a plastic binder and molding the mixture under the influence of heat, pressure and a magnetic field.

2. A method of making plastic bound permanent magnets comprising forming a plurality of rod-shaped bodies from permanently magnetic oxide powders by known sintering processes, mixing such formed bodies with a plastic binder material and molding such mixture while under the influence of a magnetic field.

3. A method of making plastic bound permanent magnets comprising forming a plurality of rod-shaped bodies of relatively small cross-section from permanent magnetic material while under the influence of a magnetic field, mixing such bodies with a plastic binder and molding such mixture to the desired ultimate shape and size while under the influence of a magnetic field.

4. The combination of claim 3 wherein the bodies, after the initial molding, have a cross-sectional area preferably of from about one to two square millimeters and a length of about from two to four millimeters.

5. The combination of claim 3 wherein the bodies have a polygonal cross-sectional shape.

6. The combination of claim 5 wherein the polygonal shape is hexagonal or octagonal.

7. In a method of making magnets, wherein powdered permanently magnetic material is mixed with a binder and molded to a desired shape in the presence of a magnetic field, the improvement which consists of molding or pressing such powdered permanently magnetic material in the presence of a magnetic field into rod-shaped bodies of small cross-sectional area before mixing it with the binder.

8. The improvement of claim 7 wherein the bodies have a cross-sectional area of about one to two square millimeters and a length of about two to four millimeters.

9. A permanent magnet comprised of a mixture of hardened plastic material and a plurality of small rod-shaped magnetic bodies, each molded from particles of permanently magnetic materials, said bodies being held in magnetic alignment by such plastic.

10. The combination of claim 9 wherein said magnetic bodies have a cross sectional area of about one to two square millimeters and a length of from about two to four millimeters.

References Cited in the file of this patent
UNITED STATES PATENTS

| | | |
|---|---|---|
| 1,871,492 | Brennecke | Aug. 16, 1932 |
| 1,976,230 | Kato et al. | Oct. 9, 1934 |
| 1,981,468 | Roseby | Nov. 20, 1934 |
| 1,994,534 | Robinson | Mar. 19, 1935 |
| 2,144,184 | Hale et al. | Jan. 17, 1939 |
| 2,283,925 | Harvey | May 26, 1942 |
| 2,479,363 | Jewell | Aug. 16, 1949 |
| 2,577,005 | DiGiacomo | Dec. 4, 1951 |
| 2,589,766 | Bradley | Mar. 18, 1952 |

FOREIGN PATENTS

| | | |
|---|---|---|
| 22,142 | Great Britain | 1900 |
| 458,047 | Great Britain | Dec. 11, 1936 |

OTHER REFERENCES

"Permanent Magnets From Ultrafine Iron Powder," Electrical Engineering, May 1952, pp. 447–451.

"The Magnetic Structure of Alnico 5," Electrical Engineering, June 1952, pp. 530–534.